United States Patent [19]

Bolte et al.

[11] Patent Number: 4,740,284
[45] Date of Patent: Apr. 26, 1988

[54] HOLDER FOR A FERROMAGNETIC CONTAINER BODY OPEN AT BOTH ENDS FOR TRANSPORT ON A CONVEYOR

[75] Inventors: Georg Bolte, Vechelde; Hartmut Helbing, Hessisch Oldendorf, both of Fed. Rep. of Germany

[73] Assignee: Schmalbach-Lubeca AG, Braunschweig, Fed. Rep. of Germany

[21] Appl. No.: 66,045

[22] Filed: Jun. 24, 1987

[30] Foreign Application Priority Data

Jun. 26, 1986 [DE] Fed. Rep. of Germany ....... 3621383

[51] Int. Cl.$^4$ ............................................. C25D 17/06
[52] U.S. Cl. .................................................. 204/198
[58] Field of Search ................................. 204/198, 202

[56] References Cited

U.S. PATENT DOCUMENTS

| | | | |
|---|---|---|---|
| 2,640,584 | 6/1953 | Robb et al. | 198/802 |
| 2,949,581 | 6/1960 | Chebuhar | 331/91 |
| 3,133,007 | 5/1964 | Creese | 204/198 |
| 3,647,675 | 6/1969 | Fiala | 207/300 R |
| 4,447,049 | 5/1984 | Rudy | 269/46 |

FOREIGN PATENT DOCUMENTS 2024106 12/1970 Fed. Rep. of Germany .
1119019 6/1956 France .
866482 4/1961 United Kingdom .

Primary Examiner—T. M. Tufariello
Attorney, Agent, or Firm—Karl F. Ross; Herbert Dubno

[57] ABSTRACT

The holding device for conveying container bodies open at both ends made of ferromagnetic material on a conveyor has at least one permanent magnet for generating magnetic forces necessary to hold the container body on it, a supporting member attachable with the conveyor and two framework components (one of which may be made slidable) held spaced from each other aligned in the longitudinal direction of the supporting member. Alternatively in two specific examples of our invention the permanent magnet is provided in the vicinity of the framework components and the supporting member is insertable in the container body or the permanent magnet is provided on the supporting member or it is the supporting member and an electrode distinct from the supporting member is insertable in the container body. The framework members have a substantially U-shape cross section and are arranged so that their free side pieces on each side thereof parallel the longitudinal direction of the supporting member. Their side piece edges directed away from the supporting member form supporting surfaces for the mounting the opening edges of the container body.

13 Claims, 3 Drawing Sheets

HOLDER FOR A FERROMAGNETIC CONTAINER BODY OPEN AT BOTH ENDS FOR TRANSPORT ON A CONVEYOR

FIELD OF THE INVENTION

Our present invention relates to a holding device for a ferromagnetic container body open at both ends for transport on a conveyor, especially through an electroimmersion bath, i.e. an electroplastic coating or other electrodeposition bath.

BACKGROUND OF THE INVENTION

A holding device for a ferromagnetic container body open at both ends is known for transport on a conveyor with which the container body can be conveyed through a processing or treatment zone, especially through an electroimmersion bath.

To transport a container body open on both ends by a conveyor carrying it, e.g. to feed it through a processing zone or to convey it through a treatment zone, the container bodies are usually positioned comparatively closely together on the conveyor standing upright and are secured by lateral strips on the conveyor to prevent sliding.

With container bodies made of ferromagnetic material the conveyor can be constructed as a so-called magnetic band conveyor which holds the container bodies in their position on the conveyor because of magnetic forces.

To be sure magnetic band conveyors are more suitable for a container body having only one end open made of ferromagnetic material when these are transported sitting on its base on the conveyor. This is because only in this position magnetic forces act effectively on the container body to guarantee a secure holding of the container body in an upright position. With a container body open on both ends and conveyed upright on the magnetic band only comparatively small magnetic and/or holding forces are developed.

If in a single step of the conveyor a direction change upwardly or downwardly occurs, conveyors without magnetic holding forces are completely unsuitable. Using magnetic band conveyors the holding forces effective on a container body open on both ends are still more strongly reduced in the vicinity of the direction changes of the conveyor since the container body no longer stands completely upright on the conveyor.

The known conveyors are completely unsuitable for attaining and maintaining a reliable mounting of a container body on the conveyor for transport of the container body through the immersion bath and for transport through other treatment zones in which the container body should be acted on all sides by a treating medium, for example in drying, and are usable only by making allowances for considerable disadvantages.

Because of these problems a special holding device as described in German Open Application DE-OS 20 24 106 for immersion treatment of container bodies open on both ends has been developed. These holding devices are positioned above the immersion bath and comprise two planar sieve like carriers running parallel to each other between which the container bodies are received and lowered jointly with the sieve carriers into the treatment fluid.

OBJECTS OF THE INVENTION

It is an object of our invention to provide an improved holding device for a ferromagnetic container body open at both ends for transport on a conveyor, particularly for transport through a processing or treatment zone in which the container body must be accessible from all sides.

It is also an object of our invention to provide an improved holding device for a ferromagnetic container body open at both ends for transport on a conveyor which is formed so that a container body open on both ends can be held reliably directed upwardly or downwardly on the conveyor freely accessible from all sides.

It is another object of our invention to provide an improved holding device for a ferromagnetic container body open at both ends for transport on a conveyor which is such that problem-free mounting and dismounting of the container body from the apparatus as well as transport of the container body along locations where the conveyor turns around is possible.

SUMMARY OF THE INVENTION

These objects and others which will become more readily apparent hereinafter are attained in accordance with our invention in a holding device for transporting a ferromagnetic container body open at both ends on a conveyor with which the container body can be conveyed through a processing or treatment zone, especially in an electroimmersion bath.

According to our invention at least one permanent magnet, a supporting member projecting from the conveyor and attachable with the conveyor and two framework components held spaced from each other on the supporting member and aligned along the longitudinal direction of the supporting member are provided.

The framework components each have a U-shape cross section with a plurality of free side pieces on both sides thereof extending parallel to the longitudinal direction of the supporting member whose plurality of side piece edges are directed away from the supporting member have a plurality of supporting surfaces for mounting a plurality of opening edges of the container body.

In one embodiment of our invention the permanent magnet is held between the side pieces and the supporting member with the framework components is insertable in the container body in the axial direction of the container body. In this form of our invention the container body is held by the permanent magnet on the framework component.

Alternatively in another embodiment of our invention the supporting member is not insertable in the container body and is equipped with or is the permanent magnet.

With either of these forms of our invention the container body held on the holding device is pressed by magnetic forces with its opposing opening edges against the side piece edges of the free side pieces of the U-shape framework components so that a contact between the framework components and the container body only occurs at the positions on the opening edges which lie inside the fold seam on later folding of the container body.

If the container body for embodiment is put through an electroimmersion bath (electrophoretic coating or electrodeposition bath) to provide corrosion protection for the inner and outer wall surfaces there is no corrosion protecting coating at these positions of contact between the device and the container body. Of course in the standard set up for making finished containers this is no longer a disadvantage.

Furthermore with the described framework components of the holding device according to our invention it is possible to mount container bodies of different diameters on the holding device. If this were not the case different holding devices would be needed for different container bodies.

For mounting the container body on the holding device according to the embodiment in which the supporting member is the permanent magnet and is not insertable in the container body the individual container body is brought into an aligned position with the supporting member and approaches the supporting member in the region between the cooperating framework members until moved in the direction of the supporting member by the magnetic pulling force with increasing speed until mounted on the framework components.

In the embodiment of our invention in which the permanent magnets are provided in the framework components it is only necessary to insert the supporting member with the framework components with their side pieces held on the supporting member parallel to the longitudinal axis of the container body until the framework components are positioned to engage the opening edges of the container body so that the container body is held on the framework components by the magnetic pulling forces after the container body and the framework components approach each other.

On removal of the container body from the holding device for a short distance the magnetic holding force are overcome until the container body is released and then transported further on conveyors previously described and known.

To handle container bodies of different length it is advantageous that at least one of the framework members is held slidable in the longitudinal direction of the supporting member on the supporting member.

The edges of the supporting surfaces of the framework components cooperating with the opening edges of the container body can run parallel to the supporting member, however in contrast can also be graded off from the supporting member.

It has proven particularly appropriate when the side piece edges of the free side pieces of the framework components provided for mounting of opening edges of the container body are inclined so that side piece edges of the framework components cooperating with the opposing opening edges are facing each other. A certain centering of the container body between the cooperating edges of the two framework components occurs simultaneously because of that.

The slope of these side piece edges can be either linear or can follow a curved path. Besides the centering function of the side piece edges it also important to recognize that the danger of the container body sliding off is avoided. Because of the inclined course of these edges the magnetic retaining forces work against the container body sliding off the holding device.

It is especially appropriate when the supporting member is held on a plate made of an electrically insulating material positioned substantially perpendicular to the longitudinal direction of the supporting member for attachment to the conveyor. Because of that the holding device of our invention can be made as a preassembled unit and is detachably mountable interchangeably with an appropriate conveyor for embodiment and chain or belt carrier.

The above described structure for the holding device is especially suitable to transport a container body through an electroimmersion bath.

In the embodiment of our invention in which the supporting member is provided with or is a permanent magnet it is particularly desirable when the plate holding the supporting member extends from the supporting member in the same direction as the edges of the framework components and a slidable electrode is held in the plate directed in the longitudinal direction of the supporting member substantially parallel to the supporting member so that the electrode projects into the interior of the container body held on the framework members in an end position.

It is particularly advantageous when the electrode supports itself by a spring on the plate so that because of the action of the spring it can be moved into a position in which it no longer projects into the container body held on the framework components. This motion of the electrode is required because otherwise there would be difficulties on changing the container body into the holding position and on removing the container body from the holding device.

Because of a greater facility in using the above named holding device with the specially provided electrode for feeding the container body through an electorimmersion bath it is particularly appropriate when the framework component closest to the plate is attached to the plate, comprises an electrically conductive material and is a current carrying element by which the container body is subjected to a suitable voltage to cooperate with the electrode projecting into the container body.

The equipping of the supporting members with permanent magnets is possible in a variety of different ways. It is particularly desirable when the supporting member is a rod like permanent magnet or is equipped with a permanent magnet in the vicinity between the framework members and when the furthest framework component from the plate is held slidably on the supporting member.

The equipping of the supporting member with a permanent magnet can occur in such a way that the supporting member is constructed as a jacket located substantially between the framework members in which the permanent magnet is received.

In this structure the permanent magnet is protected. When the supporting member is itself formed as a rod like permanent magnet advantageously it is provided with a protective shroud, for embodiment a foil shroud.

The slidable arrangement of the framework component furthest from the plate on the supporting member is particularly beneficial because in this case the supporting member forms the holding element for this framework component which is not electrically connected with a voltage source.

In the holding device according to our invention in which the framework components are equipped with the permanent magnet and the supporting member is insertable in the container body it is particularly appropriate when the supporting member is also an electrode and supports itself by a spring on the plate when the framework components are connected by insulating bars with the supporting members and when further the framework component closest the plate in engagement of the supporting member with the container body is a current carrying element.

In this arrangement the supporting member forming the electrode with the framework components is held in the plate slidable by motion of the supporting member in its longitudinal direction so that it is movable to receive and release the container body in a location outside of the motion path of the container body.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
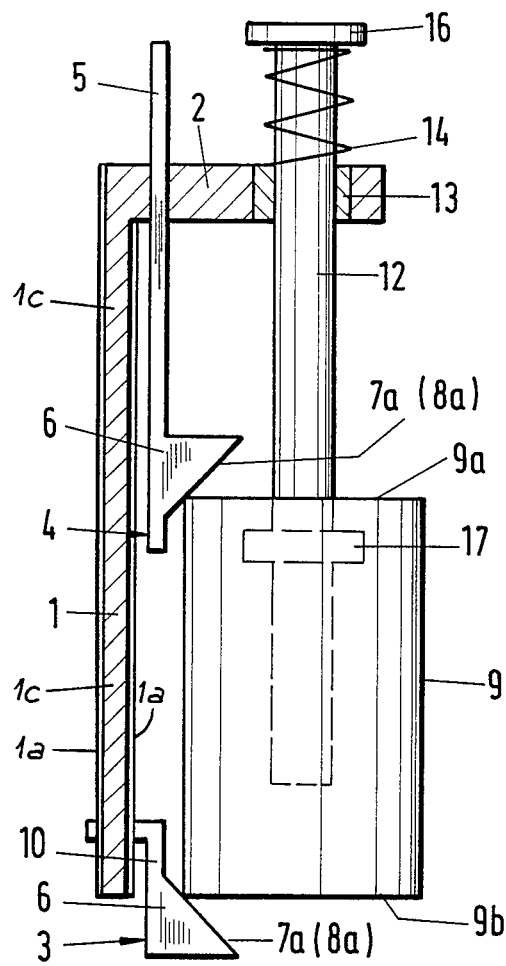
FIG. 1 is a partially side elevational, partially longitudinal cross sectional view of a holding device for transport on a conveyor according to our invention with a supporting member which is equipped with a permanent magnet.
Figure 2:
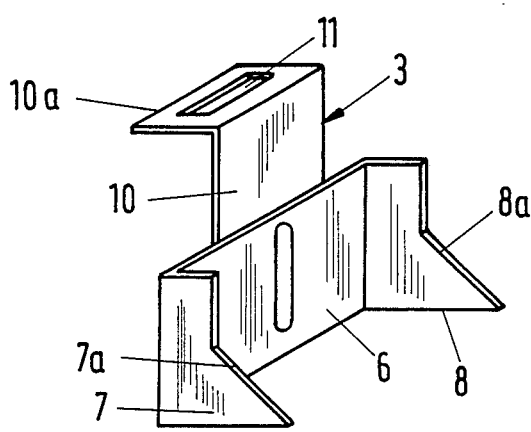
FIG. 2 is a perspective view of a framework component of the device according to FIG. 1.
Figure 3:
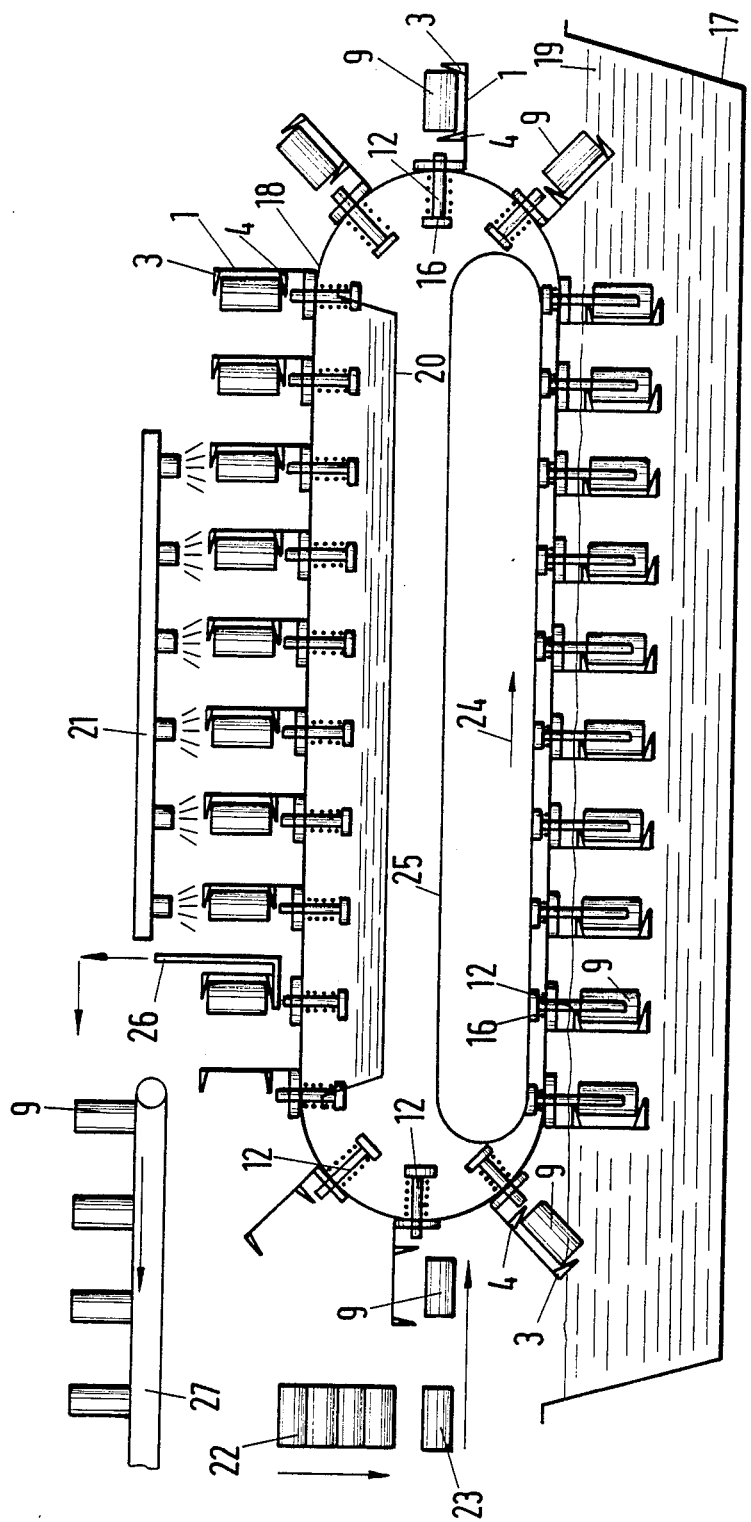
FIG. 3 is a schematic diagram showing how the holding device according to FIG. 1 is used in connection with an electroimmersion bath.

The holding device reproduced in FIGS. 1 to 3 has a supporting member 1 which comprises a permanently magnetic material 1c and has a jacket 1a protecting it.

In the embodiment the supporting member or rod 1 is mounted on a plate 2 made of electrical insulating material oriented substantially at right angles to it.

The plate 2 serves for attachment of the device reproduced in FIG. 1 to a conveyor. The arrangement on the conveyor is such that the supporting member or rod 1 projects from the conveyor as is apparent from FIG. 3.

Retaining elements which are not shown in detail in the drawing are appropriately provided on either the plate or on the conveyor to releasably secure the plate 2 to the conveyor. Clamping devices can be provided on the conveyor or however on the support plate.

The apparatus according to FIGS. 1 to 3 has two framework components 3 and 4 held aligned along the supporting member or rod 1 of which in the embodiment of FIG. 1 the framework component 3 is held longitudinally slidable on the supporting member or rod 1 while the framework component 4 is positioned at the end of a rod 5 which extends through a fitting opening in the plate 2.

At least the framework component 4 and the rod 5 connected with it are made of an electrically conductive material so that during use of the device according to FIG. 1 in connection with an electrochemical bath according to FIG. 3 the framework components 4 and the associated rod 5 are formed as current conducting elements and can be connected with one pole of a voltage source.

The framework components 3 and 4 have supporting elements 6 formed with corresponding U-shape cross sections as is apparent from the illustration in FIG. 2 in connection with the framework components 3.

The free side pieces 7 and 8 on both sides of the supporting member or rod 1 extending parallel to its longitudinal direction have supporting surfaces on their side piece edges 7a, 8a spaced from the supporting member or rod 1 for mounting the opposing opening edges 9a and 9b on both ends of a container body 9 as is indicated in FIG. 1.

The edges 7a and 8a having supporting surfaces of the free side pieces 7 and 8 of the framework components 3 and 4 extend appropriately inclined in a direction opposite the longitudinal direction of the rod or supporting member 1. The arrangement is such that the inclined edges of both framework components 3 and 4 are facing each other as is apparent from FIG. 1.

The framework component 3 is equipped with an angular shaped support piece 10 according to FIG. 2 on whose side piece 10a an opening 11 is located which fits the cross section of the supporting member or rod 1 so that the framework component 3 can be pushed on the supporting member 1 and can be slidable in the longitudinal direction, however also held clamped.

According to FIGS. 1 and 3 a longitudinally slidable electrode 12 is held in the plate 2. It extends through a suitable opening 13 through the plate 2 and cooperates with a spring supported on the plate 2.

On one of its end the electrode 12 is provided with a contacting piece 16 which simultaneously provides a bearing surface for the spring 14 with which the electrode abuts on a current supply device during use of the device according to FIG. 1 in connection with an electroimmersion bath according to FIG. 3.

In FIG. 1 the electrode 12 is returned into a position in which it extends itself until in the interior of the container body 9 open at both ends. This corresponds to the position which the electrode 12 takes when the container body 9 open at both ends is guided through the immersion bath by the illustrated device as is apparent from FIG. 3. The other final position of the electrode is determined by the stop piece 17 which cooperates with the plate 2 when the electrode 12 is released.

The operation of the apparatus according to FIG. 1 can be seen in connection with the schematic diagram shown in FIG. 3.

In FIG. 3 an electroimmersion bath 17 is illustrated which is filled with a fluid containing an electrolytic lacquer fixing agent through which the container body 9 is conveyed for the purpose of lacquering all its surfaces.

For this purpose a row devices according to FIG. 1 are positioned on a circulating conveyor 18 whose lower strand runs above but close to the level 19 of the electrolytic fluid.

In the embodiment shown a trap tub 20 is provide below the upper strand of the conveyor 18 in which fluid sprayed from a spray device 21 into the container body 9 treated previously in the electroimmersion bath is trapped.

The container body 9 to be processed is moved into the path of the devices held on the conveyor 18 by an only schematically shown supply device 22 for embodiment by a feed mechanism 23 holding magnetically one of the container bodies 9 and is brought into such a position that it arrives between the framework components 3 and 4 of an approaching one of the holding devices as is indicated in the left portion of FIG. 3. On approach of the holding device to the container body 9 located in its path the holding device is converted into the retracted position shown in FIG. 1 because of the magnetic forces exerted by it and is held in this position. The electrode 12 locates itself in position inside of the container body 9 on receipt of the container body 9 by the holding device.

The container body 9 grasped by the holding device is immersed in the bath in a single step in the motion of the conveyor 18 in the direction of the arrow 24.

The electrode 12 thus arrives with its contacting piece 16 in contact with a current supply strip 25 which is an endless strip and presses the electrode 12 against the action of the spring 14 into the retracted position of FIG. 1 in which it is pushed in the container body 9.

The current supply strip 25 is connected with the one pole of a voltage source while the other pole of the voltage source is connected electrically with the rods 5 of the framework components 4 at least in the immersion region of the immersion bath.

On swinging out of the container body 9 from the immersion bath the electrode 12 arrives from the region of contact with the current supply strip 25 and is shifted by the spring 14 into its end position freeing the container body 9. The container body 9 reaches the spraying device 21 and is transferred after passing this device to a further conveyor 27 by an only schematically illustrated removing device 26.

Only the contacting positions of the opening edges 9a and 9b of the container body 9 are unlacquered in the described structure of the holding device which cooperates with the framework components 3 and 4. These contacting positions are located in that region of the container body 9 which is later positioned during manufacture of the complete container body in the folded connecting region with the cover and/or the base of the container body without corrosion protection.

Figure 4:
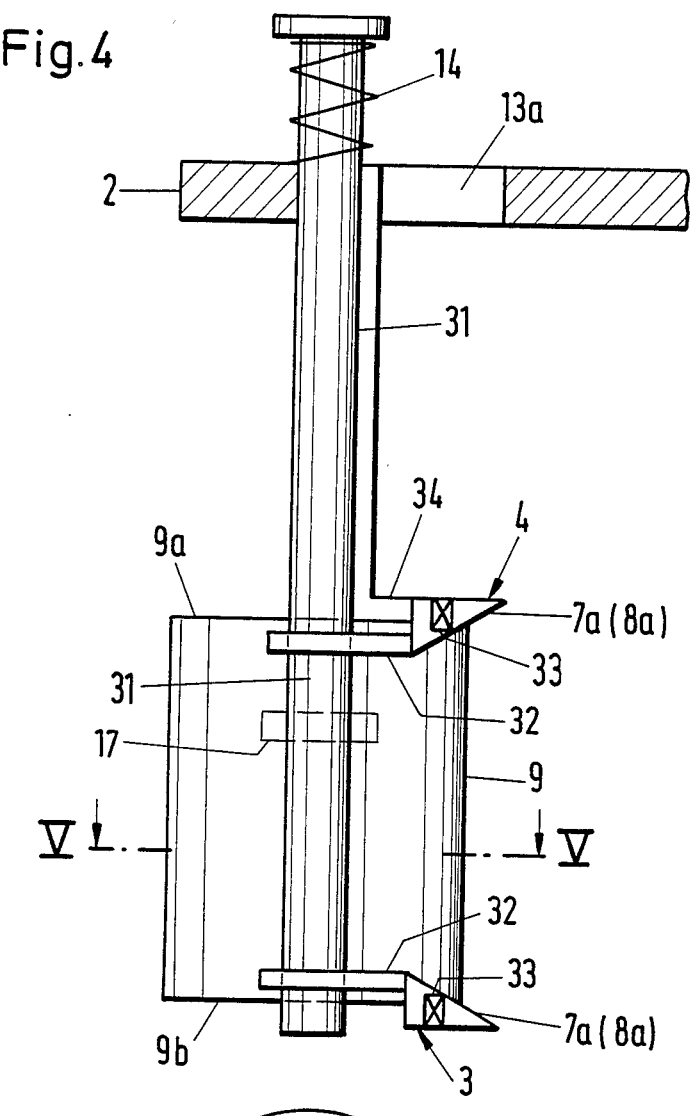
FIG. 4 is a partially side elevational, partially longitudinal cross sectional view of a supporting member formed as an electrode.
Figure 5:
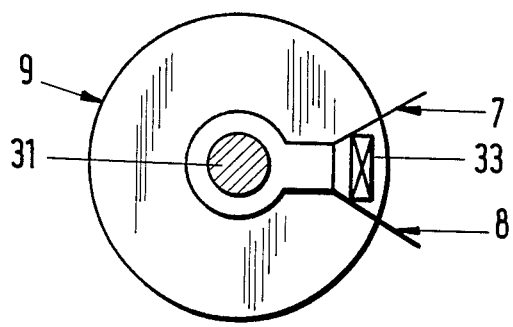
FIG. 5 is a cross sectional view through the device according to FIG. 4 taken along the section line V—V thereof.

The holding device reproduced in FIGS. 4 and 5 provides an alternative to the holding device according to FIGS. 1 and 2. In FIGS. 4 and 5 parts corresponding to those in FIGS. 1 and 2 are given the same reference character.

The holding device according to FIGS. 4 and 5 have likewise a supporting rod or member 31 which is however in this embodiment simultaneously an electrode.

The supporting rod 31 formed as an electrode is similarly held like the electrode 12 in the plate 2 and supports itself on a spring 14. The supporting rod or member 31 similarly can be pushed like the electrode 12 longitudinally until the stop piece 17 comes into contact on the supporting plate. The stop piece 17 also can be provided interiorly on the free end of the supporting rod or member 31 to move the supporting rod or member 31 out completely from the path of the container body 9 when the container body 9 should be fed in a direction perpendicular to the longitudinal extent of the supporting rod 31.

The framework components 3 and 4 similar to those of FIGS. 1 and 2 are held by insulating bars 32 on the supporting rod 31 which is in this case the electrode. Permanent magnets 33 are positioned between the free side pieces 7 and 8 of the framework components 3 and 4 which exert corresponding holding forces on the container body 9 when it reaches the vicinity of these permanent magnets 33.

The upper framework component 4 acts simultaneously as a current supply element. For this purpose the framework component 4 is connected with one pole of a voltage source by a current supply conductor 34 and like the electrode 31 can be connected with another pole of the voltage source as is described in connection with FIG. 3 for the electrode 12 in the arrangement according to FIGS. 1 and 2.

Sliding rails connected with the voltage source can be positioned along the conveyor on which the plates 2 are mounted for connection of the electrode 31 and the framework component 4 with both poles of the voltage source. The framework component 3 is held clamped but slidable along the supporting rod 31.

To introduce the supporting rod 31 of the arrangement according to FIGS. 4 and 5 with the framework components into the container body 9 it is only necessary to slide the supporting rod eccentrically parallel to the longitudinal axis of the container body into the container body and then to bring the container body the framework components together until the permanent magnets 33 become effective.

To remove the container body 9 the supporting rod with the framework component is moved in a direction transverse to the longitudinal axis of the container body 9 to slid it so that the framework components come out of engagement with the container body 9 moving the supporting rod 31 from the container body to the plate 2. For this purpose a slot like opening 13a is provided in the support plate 2 through which the framework component 4 and also the opposing framework component 3 can move through without being hindered.

The holding devices in the described embodiment are evidently usable for container bodies of different diameters and also different heights and can also be conveyed through other treatment zones like the immersion bath when it is important that a complete treatment of the container body is desired.

We claim:

1. In a holding device for transporting a container body open at both ends made of a ferromagnetic material on a conveyor with which said container body can be fed or conveyed through a treatment or processing zone, particularly through an electroimmersion bath, the improvement comprising at least one permanent magnet, a supporting member projecting from said conveyor and attachable with said conveyor and two framework components held spaced from each other on said supporting member and aligned along the longitudinal direction of said supporting member, said framework components having a U-shape cross section with a plurality of free side pieces on both sides thereof extending parallel to said longitudinal direction of said supporting member whose plurality of side piece edges of said free side pieces directed away from said supporting member have a plurality of supporting surfaces for mounting a plurality of opening edges of said container body.

2. The improvement according to claim 1 wherein said supporting member is equipped with or is said permanent magnet.

3. The improvement according to claim 1 wherein one of said permanent magnets is held between said free side pieces and said supporting member with said framework components is insertable in said container body in the axial direction of said container body.

4. The improvement according to claim 2 wherein at least one of said framework components is held slidable in said longitudinal direction of said supporting member.

5. The improvement according to claim 2 wherein said side piece edges of said free side pieces of said framework components provided for mounting of said opening edges of said container body are inclined so said side piece edges of said free side pieces cooperating with opposing ones of said opening edges are facing each other.

6. The improvement according to claim 2 wherein said supporting member is held on a plate made of an electrically insulating material positioned substantially perpendicular to said longitudinal direction of said supporting member for attachment to said conveyor.

7. The improvement according to claim 6 wherein said plate holding said supporting member extends from said supporting member in the same direction as said edges of said framework components and a slidable electrode is held in said plate directed in said longitudinal direction substantially parallel to said supporting member so that said electrode projects into the interior of said container body held on said framework members in an end position.

8. The improvement according to claim 7 wherein said electrode is supported by a spring on said plate.

9. The improvement according to claim 6 wherein said framework component closest said plate is attached to said plate and is made from an electrically conductive material and is a current carrying element.

10. The improvement according to claim 2 wherein said supporting member is a rod shaped one of said permanent magnets.

11. The improvement according to claim 3 wherein said supporting member is an electrode and supports itself by a spring on a plate and each of said framework components is attached with said supporting member by an insulating bar and on engagement of said supporting member in said container body said framework component closest said plate is a current carrying element.

12. The improvement according to claim 1 wherein said supporting member slidable in said longitudinal direction and projecting from said conveyor attachable with said conveyor is provided with two of said framework components directed away from said supporting member, held spaced on said supporting member and aligned in said longitudinal direction of said supporting member so that each of said framework components at least in the vicinity of the free ends thereof has said U-shape cross section with said free side pieces parallel to said longitudinal direction of said supporting member, said edges of said side pieces directed away from said supporting member have said supporting surfaces for contact of said opposing opening edges of said container body, a permanent magnet is held between said side pieces and said supporting member with said framework components is insertable in said container in the axial direction of said container.

13. A holding device for conveying a container body open at both ends made of a ferromagnetic material on a conveyor with which said container body can be fed or conveyed through a treatment or processing zone, particularly through an electroimmersion bath comprising:
at least one permanent magnet;
a supporting member projecting from said conveyor and attachable with said conveyor, said supporting member being provided with or being said permanent magnet;
two framework components held spaced from each other on said supporting member and aligned along the longitudinal direction of said supporting member, said framework components having a U-shape cross section with a plurality of free side pieces on both sides thereof extending parallel to said longitudinal direction of said supporting member whose plurality of side piece edges directed away from said supporting member have a plurality of supporting surfaces for mounting a plurality of opening edges of said container body, at least one of said framework components being held slidable in said longitudinal direction of said supporting member, said side piece edges of said free side pieces of said framework components provided for mounting of said opening edges of said container body being inclined so the said side piece edges of said framework components cooperating with opposing ones of said opening edges are facing each other;
a plate made of an electrically insulating material positioned substantially perpendicular to said longitudinal direction for attachment to said conveyor on which said supporting member is mounted, said plate holding said supporting member extending from said supporting member in the same direction as said side piece edges of said framework components and a slidable electrode being held in said plate directed in said longitudinal direction substantially parallel to said supporting member so that said electrode projects into the interior of said container body held on said framework members in an end position; and
a spring supporting said electrode on said plate.

* * * * *